(12) United States Patent
Chao Cheng et al.

(10) Patent No.: US 8,128,470 B2
(45) Date of Patent: Mar. 6, 2012

(54) COMPETITION CHEAT-PREVENTING SYSTEM AND METHOD

(75) Inventors: Jin-Hao Chao Cheng, Taoyuan Hsien (TW); Yu-Lun Ho, Hsinchu (TW)

(73) Assignees: Jin-Hao Chao Cheng, Taoyuan Hsien (TW); Yu-Lun Ho, Hsinchu (TW)

( * ) Notice: Subject to any disclaimer, the term of this patent is extended or adjusted under 35 U.S.C. 154(b) by 665 days.

(21) Appl. No.: 12/268,411

(22) Filed: Nov. 10, 2008

(65) Prior Publication Data

US 2009/0181739 A1    Jul. 16, 2009

(30) Foreign Application Priority Data

Jan. 10, 2008   (TW) ................................ 97100950 A

(51) Int. Cl.
*A63F 9/24*   (2006.01)
*G06F 19/00*  (2006.01)

(52) U.S. Cl. ........................................... 463/6; 235/375
(58) Field of Classification Search ....... 463/6; 235/375
See application file for complete search history.

(56) References Cited

U.S. PATENT DOCUMENTS

| | | | | |
|---|---|---|---|---|
| 5,245,162 A | * | 9/1993 | Takahashi | 235/377 |
| 5,652,573 A | * | 7/1997 | Maul et al. | 340/10.42 |
| 5,654,685 A | * | 8/1997 | Maul | 340/323 R |
| 5,825,299 A | * | 10/1998 | Fuentes et al. | 340/10.42 |
| 6,997,384 B2 | * | 2/2006 | Hara | 235/454 |
| 2008/0001815 A1 | * | 1/2008 | Wang et al. | 342/357.07 |
| 2008/0096521 A1 | * | 4/2008 | Boling et al. | 455/404.2 |

FOREIGN PATENT DOCUMENTS

| | | | |
|---|---|---|---|
| EP | 64787 A2 | * | 11/1982 |
| EP | 0118141 A2 | * | 9/1984 |
| JP | 07246265 A | * | 9/1995 |
| JP | 2000111676 A | * | 4/2000 |

\* cited by examiner

*Primary Examiner* — Dmitry Suhol
*Assistant Examiner* — Michael Grant

(57) ABSTRACT

A competition cheat-preventing system and method are applicable in a pigeon racing competition, wherein racing pigeons each wear a pigeon ring. An encrypted code-generating module is configured to generate contest encrypted codes from contest codes of the racing pigeons through specific parameter calculations. A barcode converting module is configured to convert the contest encrypted codes into two-dimensional barcodes. A barcode reading module is configured to read the two-dimensional barcodes to obtain original contest encrypted codes. An information transmission module is configured to transmit the original contest encrypted codes to a computer apparatus. An information-receiving module is configured to receive the original contest encrypted codes. A barcode decoding module is configured to perform reverse calculations to restore the original contest encrypted codes to original contest codes. A comparison module is configured to compare the original contest codes with contest codes recorded in the computer apparatus.

17 Claims, 5 Drawing Sheets

COMPETITION CHEAT-PREVENTING SYSTEM AND METHOD

FIELD OF THE INVENTION

The present invention relates to competition cheat-preventing systems and methods, and more particularly, to a competition cheat-preventing system and method by which contest encrypted codes are converted into two-dimensional barcodes.

BACKGROUND OF THE INVENTION

Pigeon racing competition is an annual great event in Taiwan and is famed for its huge purses offered to owners of the winner pigeons. This makes more than thirty-thousand pigeon owners participate in the contest every year and put all their efforts in order to win the huge purses. It is thus not hard to expect how tough the competition would be. Under such strong competitiveness, only a few owners may succeed and raise winner pigeons.

Racing pigeons are young pigeons. Most of them belong to good breeds, and are chosen, raised and trained carefully by the owners. A baby racing pigeon, generally on the sixth day of its birth, is allowed to wear a pigeon ring, wherein the pigeon ring usually contains an electronic ring and a numeric ring. After wearing the pigeon ring for one or two months, each racing pigeon must be brought to the pigeon-racing association where the racing pigeon is registered and an electronic data file is established for the pigeon. The electronic data file contains pictures of the electronic ring, the numeric ring and feather images of the pigeon.

The electronic ring of the pigeon ring usually includes a Radio Frequency Identification (RFID) module for being detected by a pigeon clock device (for example, an RFID sensing panel) when a racing pigeon wearing the pigeon ring arrives in the destination. The pigeon clock is connected to a Global Positioning System (GPS) module. The GPS module can perform global positioning and time-setting in order to prevent cheats from occurrence between two racing camps A and B that are located in difference places. Particularly, two different locations are chosen from a designated racing route to build two racing camps A and B, and the racing pigeons are raised alternatively in the two camps. In a racing competition, the racing pigeons fly initially until they enter the B camp, and then they are carried by vehicles through the highway to the A camp. By the tracking and positioning function of the GPS module, it may prevent cheaters from illegally relocating the pigeon clock to another camp. This is the first cheat-preventing mechanism.

For an official pigeon racing competition, young racing pigeons are brought to the pigeon-racing association, the pigeon clock is rectified, and the contest data are inputted to the pigeon clock. Conventionally, in order to prevent cheats, besides writing contest codes into the electronic ring, a small piece of newspaper is cut in two such that one half is placed inside the numeric ring and the other half is put into files for records. Then, the numeric ring is enclosed by a sticker, making the racing pigeon not able to be tracked down according to a given number. Once the above is done, the racing pigeons are gathered in a pigeon collecting cage, keeping them free of touch from their owners. When a racing pigeon reaches the destination, the half piece of newspaper placed inside the numeric ring is taken out and compared with the other half piece stored in the records to see if the two pieces match, so as to prevent illegal substitution of racing pigeons. This is how the second cheat-preventing mechanism works.

Even with the above two cheat-preventing mechanisms, since the second mechanism requires much manual operation to carry out comparison and verification of the two half pieces of newspaper, it often causes cheats and unfair competition results. Therefore, the problem to be solved here is to provide a cheat-preventing system and method, which can allow the pigeon racing competition to proceed fairly, safely and without much manpower, in order to avoid cheats as desired.

SUMMARY OF THE INVENTION

In view of the above drawbacks in the prior art, an objective of the present invention is to provide a competition cheat-preventing system and method for use in a pigeon racing contest, which can increase the efficiency in comparison and verification of contest codes by means of converting contest encrypted codes into two-dimensional barcodes (Quick Response codes; QR codes).

Another objective of the present invention is to provide a competition cheat-preventing system and method for use in a pigeon racing contest, which can adopt the sensing between a Radio Frequency Identification (RFID) module and a sensing panel to provide a backup system for the RFID system.

Still another objective of the present invention is to provide a competition cheat-preventing system and method for use in a pigeon racing contest, which can transmit RFID signals and contest encrypted codes of the identified QR codes in turn back to the pigeon-racing association for performing comparison and analysis, thereby greatly reducing cheats in the pigeon racing contest.

A further objective of the present invention is to provide a competition cheat-preventing system and method for use in a pigeon racing contest, which can install a Global Positioning System (GPS) module in a pigeon clock so as to prevent the pigeon clock from being illegally moved to another pigeon camp in the pigeon racing contest.

In accordance with the above and other objectives, the present invention proposes a competition cheat-preventing system for use in a pigeon racing competition, allowing information transmission to be performed through an information transmission system between a computer apparatus and a remote pigeon clock device and between the computer apparatus and a mobile communications device having a camera module, wherein racing pigeons each wear a pigeon ring, the competition cheat-preventing system comprising: an encrypted code-generating module configured to generate contest encrypted codes from contest codes of the racing pigeons through calculations of specific parameters in the computer apparatus; a barcode converting module configured to convert the contest encrypted codes into two-dimensional barcodes and allow the two-dimensional barcodes to be outputted from the computer apparatus and placed in the pigeon rings of the racing pigeons; a barcode reading module configured to identify images of the two-dimensional barcodes in the pigeon rings captured by the camera module of the mobile communications device for the racing pigeons reaching the remote pigeon clock device, and read contents of the two-dimensional barcodes to obtain original contest encrypted codes; an information transmission module connected to the mobile communications device and configured to transmit the original contest encrypted codes to the computer apparatus; an information-receiving module connected to the computer apparatus and configured to receive the original contest encrypted codes transmitted by the information transmission module; a barcode decoding module configured to perform reverse calculations on the received original contest encrypted codes through specific parameters corresponding to the encrypted code-generating module so as to restore the original contest encrypted codes to original contest codes; and a comparison module configured to compare the original contest codes and contest codes recorded in the computer apparatus for verifying consistency therebetween.

In another embodiment, the competition cheat-preventing system further comprises: a Radio Frequency Identification (RFID) module placed in the pigeon rings of the racing pigeons; a communications module connected to the remote pigeon clock device; and a plurality of sensing modules connected to the remote pigeon clock device. When the racing pigeons fly and reach the remote pigeon clock device, the sensing modules connected to the remote pigeon clock device sense the RFID module placed in the pigeon rings to obtain RFID signals and transmit the RFID signals back to the computer apparatus through the information transmission system, so as to compare contest codes in the RFID module with contest codes recorded in the computer apparatus for verifying consistency therebetween.

The present invention also propose a competition cheat-preventing method for use in a pigeon racing competition, allowing information transmission to be performed through an information transmission system between a computer apparatus and a remote pigeon clock device and between the computer apparatus and a mobile communications device having a camera module, wherein racing pigeons each wear a pigeon ring that includes a RFID module therein, and the remote pigeon clock device is connected to a communications module and a sensing module, the competition cheat-preventing method comprising the steps of: first, generating contest encrypted codes from contest codes of the racing pigeons through calculations of specific parameters in the computer apparatus; then, converting the contest encrypted codes into two-dimensional barcodes and printing out the two-dimensional barcodes via the computer apparatus; then, placing the two-dimensional barcodes in the pigeon rings of the racing pigeons; when the racing pigeons reach the remote pigeon clock device, identifying images of the two-dimensional barcodes in the pigeon rings taken by the camera module of the mobile communications device, and reading contents of the two-dimensional barcodes to obtain original contest encrypted codes; then, transmitting the original contest encrypted codes to the computer apparatus via the mobile communications device; then, receiving the original contest encrypted codes transmitted by the mobile communications device; performing reverse calculations on the received original contest encrypted codes through specific parameters corresponding to the encrypted code-generating module so as to restore the original contest encrypted codes to original contest codes; and finally, comparing the original contest codes with contest codes recorded in the computer apparatus to verify consistency therebetween.

In another embodiment, the competition cheat-preventing method further comprises the steps of: inputting the contest codes of the racing pigeons into the RFID module before placing the RFID module in the pigeon rings; when the racing pigeons reach the remote pigeon clock device, connecting the sensing module of the remote pigeon clock device with the RFID module so as to obtain the RFID signals; transmitting the RFID signals back via the information transmission system to the computer apparatus; and comparing contest codes in the RFID module with contest codes recorded in the computer apparatus to verify consistency therebetween.

Therefore, according to the competition cheat-preventing system and method of the present invention, contest encrypted codes are generated by using specific parameters in the computer apparatus, and are converted into two-dimensional barcodes (QR codes) that are read by the mobile communications device and then transmitted back to the computer apparatus for decoding. In contrast to the prior art using manual operation of cutting a piece of newspaper in two and having one half placed in the pigeon ring and the other half stored in the file data for subsequent comparison, the present invention is more efficient and secure without the need of manual operation. Further, by the competition cheat-preventing system and method of the present invention, when racing pigeons released over the ocean arrive at the destination pigeon camp, the sensing panel connected to the pigeon clock device in the pigeon camp can immediately sense the RFID module embedded in the pigeon rings of the racing pigeons, such that the RFID signals can be transmitted back to the computer apparatus provided in the pigeon-racing association by the pigeon clock device, for use in subsequent comparison of contest codes. As a result, in addition to the QR code operation, the present invention further includes transmission of the RFID signals for code consistency verification, such that it equivalently possesses two pigeon clock systems and thus is capable of replacing the conventional newspaper cutting operation.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Preferred embodiments of a competition cheat-preventing system and method as proposed in the present invention are described as follows with reference to FIGS. 1 to 5. It should be understood that the drawings are schematic diagrams only showing relevant components in the present invention, and the practical component layout could be more complicated.

Figure 1:
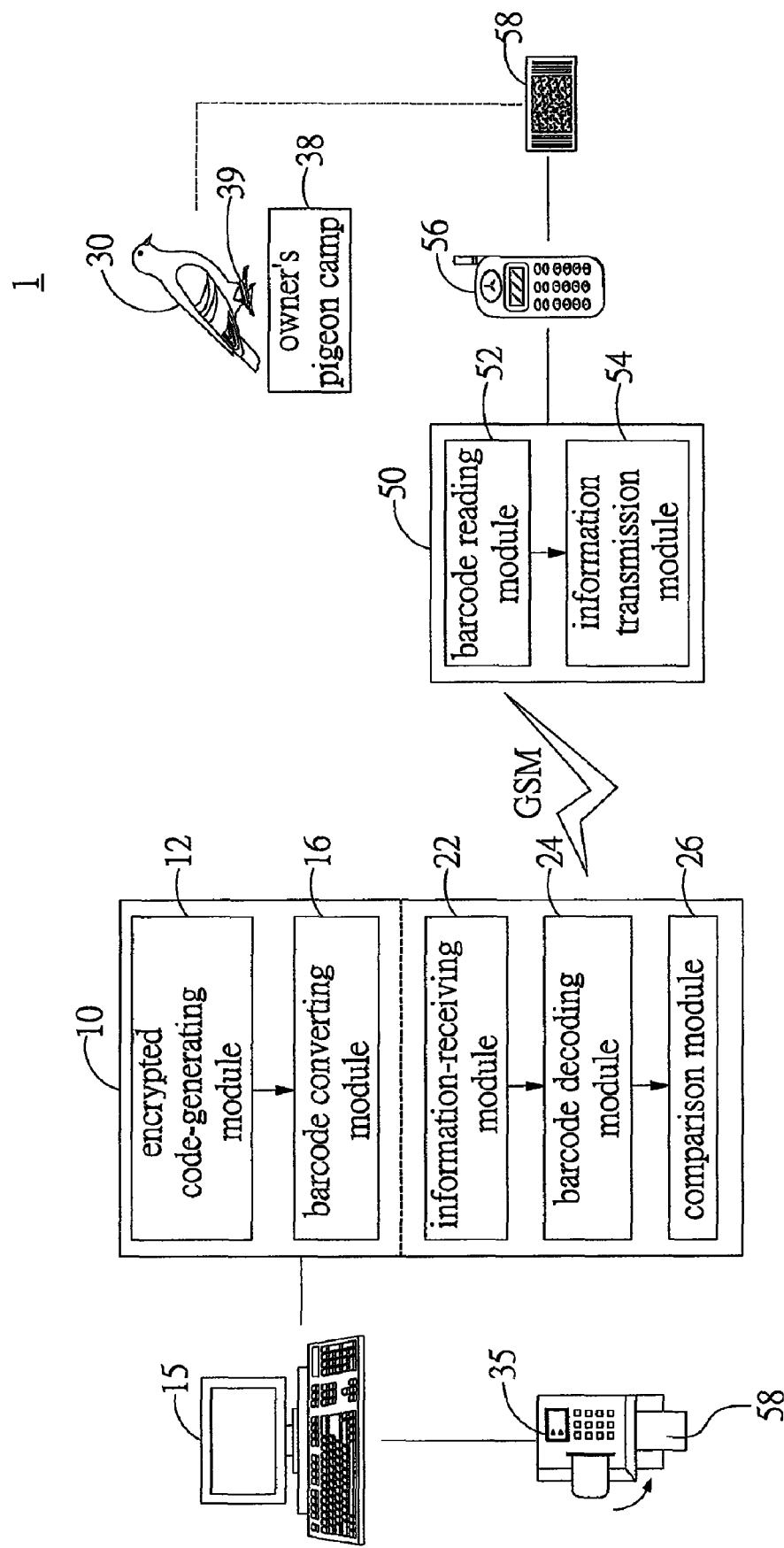
FIG. 1 is a block diagram showing the systemic architecture of a competition cheat-preventing system according to a first embodiment of the present invention.

FIG. 1 is a block diagram showing the systemic architecture of a competition cheat-preventing system 1 according to a first embodiment of the present invention. The competition cheat-preventing system 1 is, for example, constructed on a communications network of a mobile communications and computer apparatus having remote communications functionality. In this embodiment, the computer apparatus is provided at the pigeon-racing association, and is a device having data processing and communication transmission functionality, including (but not limited to) a workstation, personal computer (PC), notebook computer, server, mobile phone or personal digital assistance (PDA). The computer apparatus may be peripherally connected to a printing device for printing the pigeon-racing information, two-dimensional barcodes (Quick Response codes; QR codes), etc. The computer apparatus may further include a communications module. The communications module can be connected to a base station directly by a special line or connected to the Public Switched Telephone Network (PSTN) via a telephone line (RJ11).

The competition cheat-preventing system 1 of the present invention allows the arrival time of a racing pigeon at the destination (i.e. the owner's pigeon camp) and contest codes thereof to be fast and safely transmitted back to an electronic apparatus installed in the pigeon-racing association in a pigeon-racing competition. As shown in FIG. 1, the competition cheat-preventing system 1 comprises: a computer apparatus 15 and an application software set 10 installed in the computer apparatus 15, wherein the application software set 10 includes an encrypted code-generating module 12; a barcode converting module 16; an information-receiving module 22; a barcode decoding module 24, and a comparison module 26; and a mobile communications device module set 50 comprising a barcode reading module 52 and an information transmission module 54.

Before a pigeon racing competition begins, racing pigeons must be collected in the pigeon-racing association, and owners thereof need to provide and input relevant information about their racing pigeons so as to initialize settings of the competition cheat-preventing system 1. The relevant information includes, but not limited to, owners' identification (ID) data, breeds of racing pigeons and/or ID data of the racing pigeons. The components of the competition cheat-preventing system 1 are described respectively in detail as follows.

The encrypted code-generating module 12 is configured to generate contest encrypted codes from contest codes of the racing pigeons through specific parameter calculations in the computer apparatus 15. The specific parameters include, but not limited to, date on joining the pigeon racing competition, the number of racing pigeons of the preceding owner, the order of pigeon collection and/or the radical number thereof. Other parameters may also be used.

The barcode converting module 16 is configured to convert the contest encrypted codes (generated by the encrypted code-generating module 12) into two-dimensional barcodes (QR codes) 58, such that a printing device 35 connected to the computer apparatus 15 may print out the QR codes 58 for a user to put the QR codes 58 in a pigeon ring 39 of a racing pigeon 30. The QR codes are made based on internationally recognized two-dimensional barcode standard from Japan.

The barcode reading module 52 identifies an image of the QR codes 58 in the pigeon-ring 39 captured by a camera module (not shown) installed in the mobile communications device 56 when the racing pigeon 30 arrives at a remote pigeon clock device 40 in the destination camp (i.e. owner's pigeon camp), so as to read the contents of the QR codes 58 and obtain the original contest encrypted codes.

The information transmission module 54 is connected to the mobile communications device 56, for transmitting the original contest encrypted codes to the computer apparatus 15. The information transmission module 54 may be a transmission module supported by (but not limited to) Global System for Mobile Communications (GSM), a Code Division Multiple Access (CDMA) system or a 3.5G system, in compliance with the rules of the pigeon-racing association.

The information-receiving module 22 is connected to the computer apparatus 15, for receiving the original contest encrypted codes transmitted by the information transmission module 54. The information-receiving module 22 may be directly connected to a base station (not shown) by means of a special line so as to transmit signals received by the base station to the computer apparatus 15.

The barcode decoding module 24 is configured to perform reverse calculations for restoring the original contest encrypted codes (received by the information-receiving module 22) back to the original contest codes through specific parameter calculations corresponding to the encrypted code-generating module 12. In this embodiment, the original contest codes are readable word codes.

The comparison module 26 is configured to compare the original contest codes with the contest codes recorded in the computer apparatus 15 for consistency, so as to prevent cheats in the pigeon racing competition. The comparison may be carried out in an automatic manner conducted by a program established, and/or the codes may be printed out and the comparison is performed by manual operation.

Figure 2:
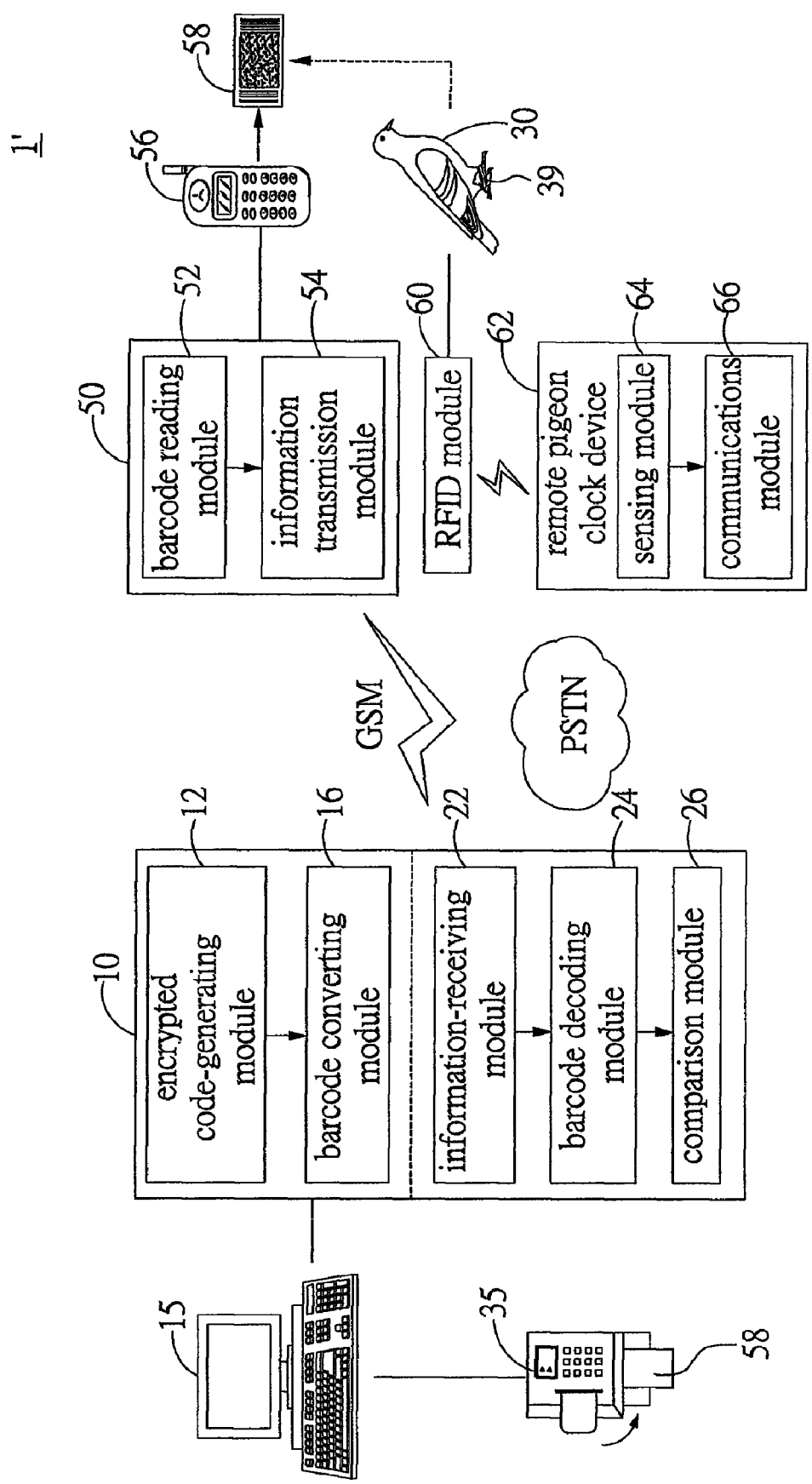
FIG. 2 is a block diagram showing the system architecture of a competition cheat-preventing system according to a second embodiment of the present invention.

FIG. 2 is a block diagram showing the system architecture of a competition cheat-preventing system 1' according to a second embodiment of the present invention. In this embodiment, except for a remote pigeon clock device 62 installed at the owner' pigeon camp and a Radio Frequency Identification (RFID) module 60 provided in the pigeon ring 39, the operational relationships between the components of the competition cheat-preventing system 1' are the same as those of the first embodiment shown in FIG. 1, and thus the detailed descriptions thereof are omitted herein for brevity.

The second embodiment differs from the first embodiment in that, for the competition cheat-preventing system 1', the remote pigeon clock device 62 and the RFID module 60 provided in the pigeon ring 39 may further enhance the security and fast operation of the system. The remote pigeon clock device 62 comprises a sensing module 64 and a communications module 66. The detailed descriptions of these components are provided below.

The RFID module 60 is configured to store the contest encrypted codes when the racing pigeons are collected, and then the RFID module 60 is embedded in the pigeon ring 39 of the racing pigeon 30. The storing or writing of the contest encrypted codes in the RFID module 60 may be performed in an encryption manner using a Security Access Module (SAM) to prevent illegal detection and recording.

The sensing module 64 is configured to sense and react with the RFID module 60 that is embedded in the pigeon ring 39 when the racing pigeon 30 approaches the remote pigeon clock device 62, so as to receive RFID signals corresponding to the above codes written or stored in the RFID module 60 (when the racing pigeons are collected). The sensing module 64 may comprise a plurality of RFID sensing panels connected to the remote pigeon clock device 62.

The communications module 66 is configured to transmit the RFID signals (received by the sensing module 64) to the computer apparatus 15 through an information transmission system (such as public switched telephone network (PSTN)) for use in subsequent comparison of contest codes.

Figure 3:
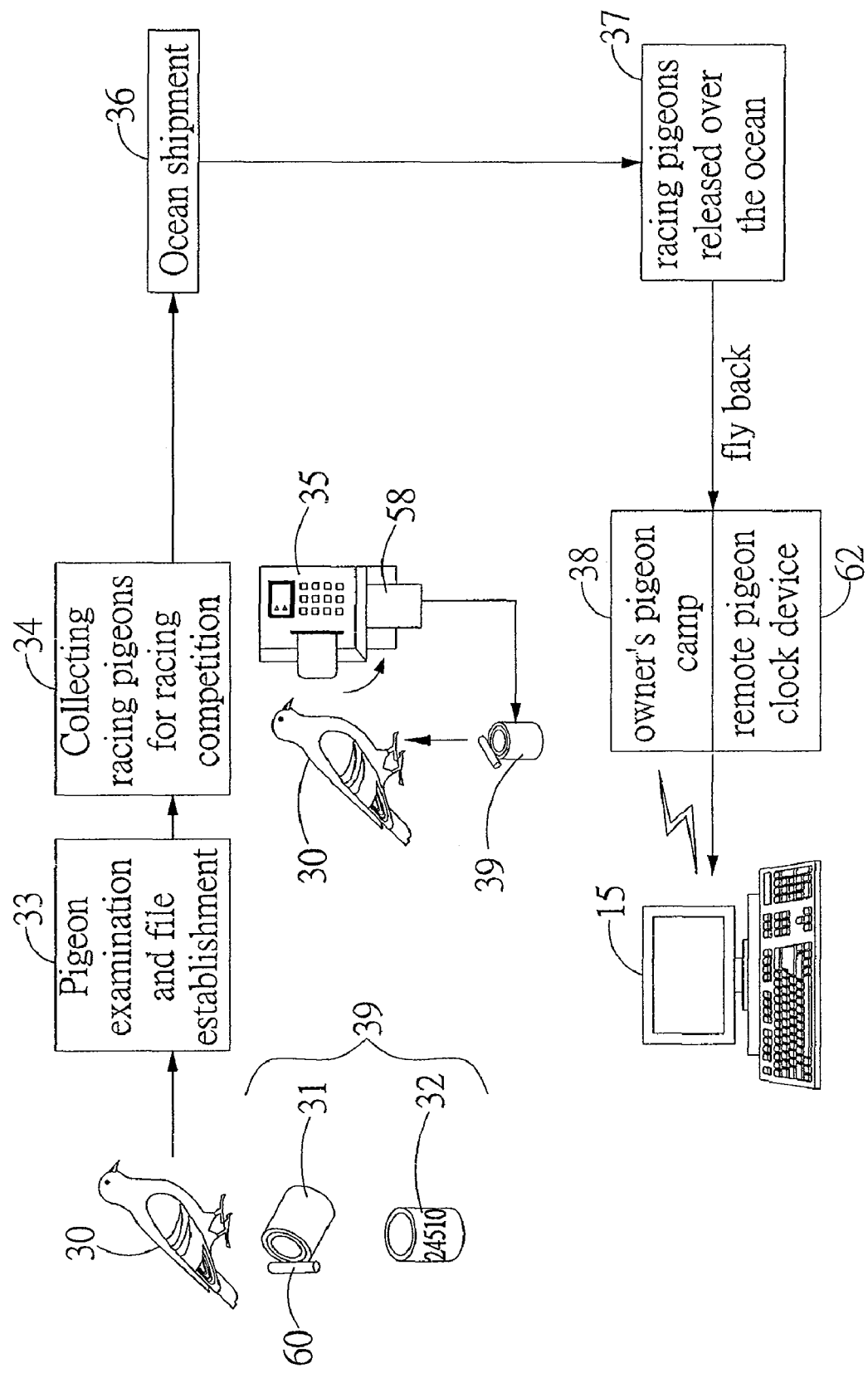
FIG. 3 is a block diagram showing the system architecture of a combination of the competition cheat-preventing system of FIG. 1 and the competition cheat-preventing system of FIG. 2 according to an embodiment of the present invention.

FIG. 3 is a block diagram showing the system architecture of a combination of the competition cheat-preventing system 1 of FIG. 1 and the competition cheat-preventing system 1' of FIG. 2 according to an embodiment of the present invention. Referring to FIGS. 1, 2 and 3, a baby racing pigeon 30 after its birth is allowed to wear an electronic ring 31 and a numeric ring 32, wherein the electronic ring 31 is formed with an aperture for accommodating the RFID module 60 therein. After about 30 days of age, the young racing pigeon is brought to the pigeon-racing association for pigeon examination and file establishment 33. When all racing pigeons are collected 34 for a racing competition, two sets of contest encrypted codes would be generated by the computer apparatus 15 in the pigeon-racing association, wherein one set of contest encrypted codes is stored into the RFID module 60, and the other set of contest encrypted codes is QR codes 58 outputted by the printing device 35. Further, the QR codes 58 are put inside the pigeon ring 39 of the racing pigeon 30. Then, all the racing pigeons 30 are gathered and are shipped by an ocean boat 36. They are released from a point over the ocean 37, thereby commencing the pigeon racing competition. When a racing pigeon 30 flies back to its owner's pigeon camp 38 (in which the remote pigeon clock device 62 is installed), the RFID module 60 embedded in the pigeon ring 39 of the racing pigeon 30 is immediately sensed by the sensing module 64 of the remote pigeon clock device 62 such that the sensing module 64 obtains RFID signals from the RFID module 60. Thereafter, the communications device 66 of the remote pigeon clock device 62 transmits, by means of an information transmission system (such as PSTN), the RFID signals containing the contest encrypted codes back to the computer apparatus 15 where the RFID signals are decoded and the time of the arrival of the racing pigeon 30 is recorded. At the same time, the owner obtains the QR codes 58 from the pigeon ring 39 and takes an image thereof by the camera module (not shown) of the mobile communications device 56 to capture the contents of the QR codes 58. Then, the contents of the QR codes 58 captured by the camera module can be read by the barcode reading module 52 (such as QR code reading software) connected to the mobile communications device 56, so as to acquire the original contest encrypted codes. Subsequently, the mobile communications device 56 transmits the acquired contest encrypted codes through the information transmission system (such as GSM system) back to the computer apparatus 15 where the contest encrypted codes are decoded and the time of transmission of the contest encrypted codes is recorded, as well as the number of a Subscriber Identity Module (SIM) card of the owner is recorded for identifying the owner.

According to the foregoing description, it is understood that there are two sets of contest encrypted codes to be transmitted back to the computer apparatus 15 for decoding, wherein one set of contest encrypted codes is obtained by acquiring the RFID signals of the RFID module 60, and the other set of contest encrypted codes is obtained by taking the image of the QR codes 58 and reading the contents thereof. The transmitted signals (contest encrypted codes) are decoded by the barcode decoding module 24 to obtain both two sets of original contest codes, and both sets are compared with the contest codes recorded in the computer apparatus 15 respectively, so as to determine whether the contest codes belong to the same racing pigeon 30. Therefore, in the present invention, two sets of contest codes are verified by the recorded contest codes in the computer apparatus 15. This is equivalent to having two pigeon clock devices for double verification performances, thereby effectively preventing cheats in the pigeon racing competition. Moreover, the interval between transmitting the contest encrypted codes from the mobile communications device 56 and transmitting the RFID signals is set to be less than a certain period of time (for example, 10 minutes), in order to further reduce the chance of making cheats.

Figure 4:
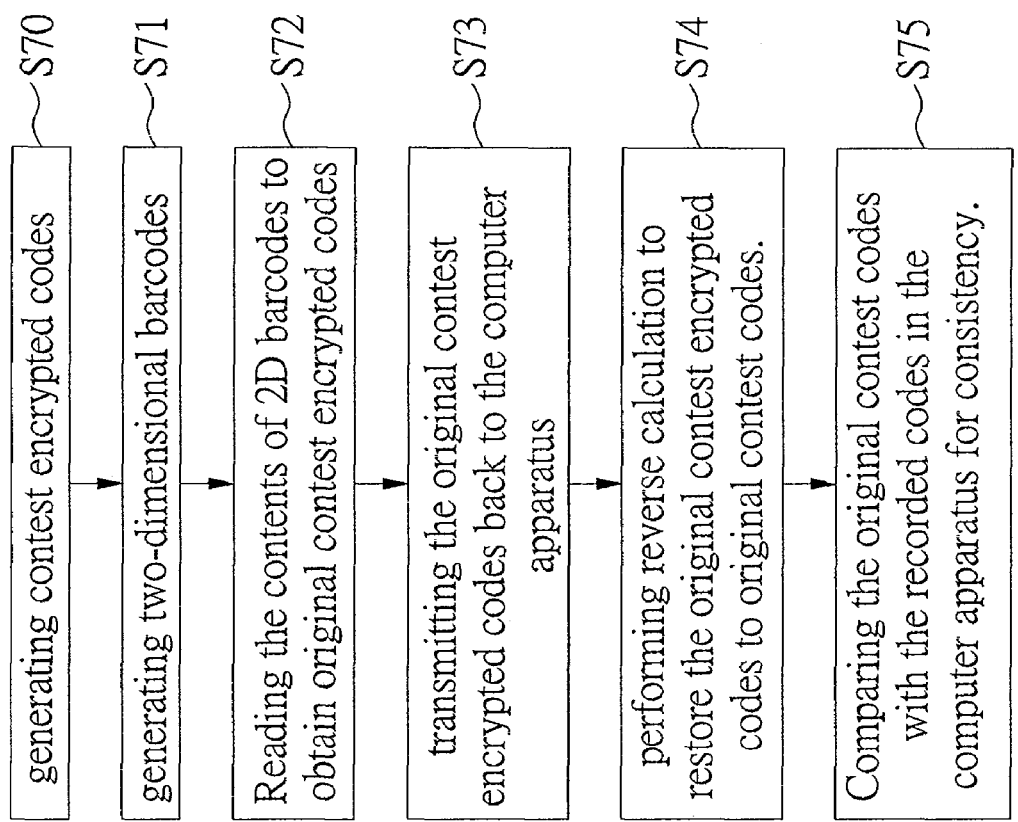
FIG. 4 is a flow diagram showing the basic steps of a competition cheat-preventing method according to an embodiment of the present invention.

FIG. 4 is a flow diagram showing the basic steps of a competition cheat-preventing method according to an embodiment of the present invention. As shown in FIG. 4, the competition cheat-preventing method of the present invention, for use in a pigeon-racing competition, is advantageous of having information transmission through an information transmission system between a computer apparatus and a remote pigeon clock device and between the computer apparatus and a mobile communications device having a camera module, wherein each racing pigeon wears a pigeon ring having an RFID module embedded therein, and the remote pigeon clock device is connected to a communications module and a sensing module. The competition cheat-preventing method comprises the following steps.

In step S70, contest encrypted codes are generated by using specific parameter calculations of contest codes in the computer apparatus, wherein the specific parameters include, but not limited to, date on joining the pigeon racing competition, the number of racing pigeons of the preceding owner, and the order of pigeon collection and/or the radical number thereof. Then, step S71 is performed.

In step S71, the contest encrypted codes are converted into two-dimensional barcodes (QR codes) and the QR codes are printed out by the computer apparatus, such that the QR codes can be put in the pigeon rings of the racing pigeons. Then, step S72 is performed.

In step S72, when the racing pigeons reach the remote pigeon clock device, images of the QR codes in the pigeon rings of the racing pigeons are captured by the camera module of the mobile communications device, and the contents of the QR codes can be read by code reading software provided to the mobile communications device so as to obtain the original contest encrypted codes. Then, step S73 is performed.

In step S73, the original contest encrypted codes are transmitted back to the computer apparatus by the mobile communications device. Then, step S74 is performed.

In step S74, the original contest encrypted codes transmitted by the mobile communications device are received and the receiving time is recorded, and then, reverse calculations are performed to restore the original contest encrypted codes to the original contest codes. Then, step S75 is performed.

In step S75, the original contest codes are compared with contest codes recorded in the computer apparatus to verify consistency therebetween, so as to prevent cheats in the pigeon racing competition.

Figure 5:
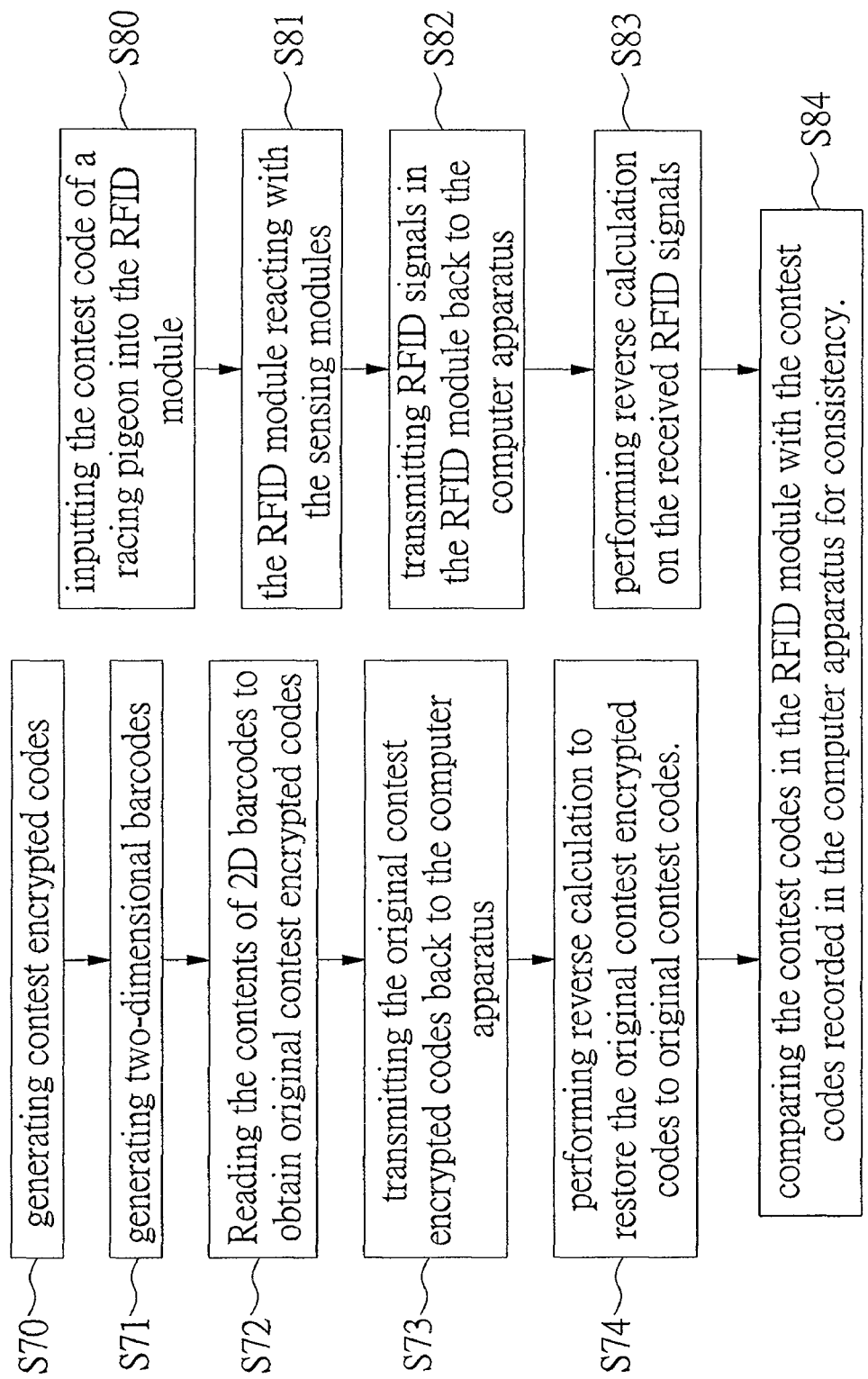
FIG. 5 is a flow diagram showing the basic steps of the competition cheat-preventing method according to another embodiment of the present invention.

FIG. 5 is a flow diagram showing the basic steps of the competition cheat-preventing method according to another embodiment of the present invention. FIG. 5 is used to describe detailed steps of comparing the restored original contest codes by reading the two-dimensional barcodes according to FIG. 4. Except for steps S80 to S84, the steps shown in FIG. 5 are the same as those in the FIG. 4 and thus the descriptions thereof are omitted herein for brevity. In this embodiment, the following steps are performed to further enhance the security of transmitting the contest codes.

In step S80, the contest codes are inputted to the RFID module before the module is embedded in the pigeon rings of the racing pigeons. Then, step S81 is performed.

In step S81, when the racing pigeons reach the remote pigeon clock device, the sensing module connected to the remote pigeon clock device senses and reacts with the RFID module to obtain RFID signals. Then, step S82 is performed.

In step S82, the RFID signals are transmitted back to the computer apparatus by an information transmission system (such as PSTN). Then, step S83 is performed.

In step S83, the received RFID signals are subjected to reverse calculations to restore the RFID signals to the original contest codes, wherein both the reverse calculations in this step and in step S74 are performed by the barcode decoding module. Then, step S84 is performed.

In step S84, the two sets of contest codes restored in steps S74 and S83 are respectively compared with the contest codes recorded in the computer apparatus to verify consistency therebetween.

Therefore, by the competition cheat-preventing system and method according to the present invention, contest encrypted codes are generated by the computer apparatus, wherein one set thereof is converted into QR codes and printed out, and the other set thereof is written into the RFID module. The QR codes are put in the pigeon rings of the racing pigeons and the RFID module is placed in apertures of the pigeon rings before the racing pigeons are released over the ocean. When the racing pigeons fly back to the owners' pigeon camps, the sensing panels provided in the owners' pigeon camps sense the RFID module to obtain RFID signals and transmit the RFID signals back to the computer apparatus through the pigeon clock device connected to the sensing panels. Moreover, the owners take the QR codes out from the pigeon rings and capture images of the QR codes. The contents of the QR code images are identified to obtain contest encrypted codes, and then the contest encrypted codes are transmitted back to the computer apparatus where the RFID signals and the contest encrypted codes can be decoded so as to be compared with contest codes initially recorded in the computer apparatus.

Accordingly, the competition cheat-preventing system and method of the present invention are more advantageous than the prior art in terms of improving the protection of contest codes, eliminating manual operation of code comparison, and enhancing the protection mechanism of the pigeon clock device, thereby effectively reducing cheats in the pigeon racing competition.

The present invention has been described using exemplary preferred embodiments. However, it is to be understood that the scope of the present invention is not limited to the disclosed arrangements. The scope of the claims, therefore, should be accorded the broadest interpretation, so as to encompass all such modifications and equivalents.

What is claimed is:

1. A competition cheat-preventing system for use in a pigeon racing competition, allowing information transmission to be performed through an information transmission system between a computer apparatus and a remote pigeon clock device and between the computer apparatus and a mobile communications device having a non-transitory camera module, wherein racing pigeons each wear a pigeon ring, the competition cheat-preventing system comprising:
   a non-transitory encrypted code-generating module configured to generate contest encrypted codes from contest codes of the racing pigeons through calculations of specific parameters in the computer apparatus;
   a non-transitory barcode converting module configured to convert the contest encrypted codes into two-dimensional barcodes and allow the two-dimensional barcodes to be outputted from the computer apparatus and placed in the pigeon rings of the racing pigeons;
   a non-transitory barcode reading module configured to identify images of the two-dimensional barcodes in the pigeon rings captured by the non-transitory camera module of the mobile communications device for the racing pigeons reaching the remote pigeon clock device, and read contents of the two-dimensional barcodes to obtain original contest encrypted codes;
   a non-transitory information transmission module connected to the mobile communications device and configured to transmit the original contest encrypted codes to the computer apparatus;
   a non-transitory information-receiving module connected to the computer apparatus and configured to receive the original contest encrypted codes transmitted by the non-transitory information transmission module;
   a non-transitory barcode decoding module configured to perform reverse calculations on the received original contest encrypted codes through specific parameters corresponding to the non-transitory encrypted code-generating module so as to restore the original contest encrypted codes to original contest codes; and
   a non-transitory comparison module configured to compare the original contest codes and contest codes recorded in the computer apparatus for verifying consistency therebetween.

2. The competition cheat-preventing system of claim 1, wherein the remote pigeon clock device is a timing device for use in the pigeon racing competition.

3. The competition cheat-preventing system of claim 1, wherein the remote pigeon clock device comprises a non-transitory Global Positioning System (GPS) satellite positioning module for instantaneously displaying time and positional coordinates of the remote pigeon clock device on the computer apparatus via a satellite system.

4. The competition cheat-preventing system of claim 1, wherein the information transmission system comprises Global System for Mobile Communications (GSM) and/or Public Switched Telephone Network (PSTN).

5. The competition cheat-preventing system of claim 1, wherein the specific parameters include date of joining the pigeon racing competition, number of racing pigeons of a preceding owner, order of pigeon collection and/or radical number thereof.

6. The competition cheat-preventing system of claim 1, wherein the two-dimensional barcodes are Quick Response (QR) codes.

7. The competition cheat-preventing system of claim 6, wherein the non-transitory barcode reading module is code reading software for the QR codes.

8. The competition cheat-preventing system of claim 1, further comprising:
   a non-transitory Radio Frequency Identification (RFID) module configured to write the contest encrypted codes into the pigeon rings of the racing pigeons that are collected;
   at least one non-transitory sensing module configured to sense the non-transitory RFID module that approaches the remote pigeon clock device, and receive RFID signals from the non-transitory RFID module; and
   a non-transitory communications module configured to transmit the received RFID signals to the computer apparatus where the contest codes are compared.

9. The competition cheat-preventing system of claim 8, wherein the non-transitory RFID module is installed in the pigeon rings of the racing pigeons.

10. A competition cheat-preventing method for use in a pigeon racing competition, allowing information transmission to be performed through an information transmission system between a computer apparatus and a remote pigeon clock device and between the computer apparatus and a mobile communications device having a camera module, wherein racing pigeons each wear a pigeon ring that includes a Radio Frequency Identification (RFID) module therein, and the remote pigeon clock device is connected to a communications module and a sensing module, the competition cheat-preventing method comprising the steps of:

generating contest encrypted codes from contest codes of the racing pigeons through calculations of specific parameters in the computer apparatus;

converting the contest encrypted codes into two-dimensional barcodes and printing out the two-dimensional barcodes via the computer apparatus;

placing the two-dimensional barcodes in the pigeon rings of the racing pigeons;

when the racing pigeons reach the remote pigeon clock device, identifying images of the two-dimensional barcodes in the pigeon rings taken by the camera module of the mobile communications device, and reading contents of the two-dimensional barcodes to obtain original contest encrypted codes;

transmitting the original contest encrypted codes to the computer apparatus via the mobile communications device;

receiving the original contest encrypted codes transmitted by the mobile communications device;

performing reverse calculations on the received original contest encrypted codes through specific parameters corresponding to the encrypted code-generating module so as to restore the original contest encrypted codes to original contest codes; and comparing the original contest codes with contest codes recorded in the computer apparatus to verify consistency therebetween.

11. The competition cheat-preventing method of claim 10, wherein the remote pigeon clock device is a timing device for use in the pigeon racing competition.

12. The competition cheat-preventing method of claim 11, wherein the remote pigeon clock device comprises a Global Positioning System (GPS) satellite positioning module for instantaneously displaying time and positional coordinate of the remote pigeon clock device on the computer apparatus via a satellite system.

13. The competition cheat-preventing method of claim 10, wherein the information transmission system comprises Global System for Mobile Communications (GSM) and/or Public Switched Telephone Network (PSTN).

14. The competition cheat-preventing method of claim 10, wherein the specific parameters include date of joining the pigeon racing competition, number of racing pigeons of a preceding owner, order of pigeon collection and/or radical number thereof.

15. The competition cheat-preventing method of claim 10, wherein the two-dimensional barcodes are Quick Response (QR) codes.

16. The competition cheat-preventing method of claim 15, wherein the barcode reading module is code reading software for the QR codes.

17. The competition cheat-preventing method of claim 10, further comprising the steps of:

inputting the contest codes of the racing pigeons into the RFID module before placing the RFID module in the pigeon rings;

when the racing pigeons reach the remote pigeon clock device, sensing the RFID module via the sensing module connected to the remote pigeon clock device so as to obtain the RFID signals; and transmitting the RFID signals back via the information transmission system to the computer apparatus where subsequent comparison of the contest codes is performed.

* * * * *